(12) United States Patent
Hughes et al.

(10) Patent No.: US 7,224,719 B1
(45) Date of Patent: May 29, 2007

(54) FAST ACQUISITION OF A PILOT SIGNAL IN A WIRELESS COMMUNICATION DEVICE

(75) Inventors: Robbin Hughes, San Diego, CA (US); De-Gang Yao, San Diego, CA (US); Serguei A. Glazko, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/540,128

(22) Filed: Mar. 31, 2000

(51) Int. Cl.
*H04B 1/00* (2006.01)

(52) U.S. Cl. ...................... 375/147; 370/328

(58) Field of Classification Search ............... 375/142, 375/144, 147, 148, 150, 260, 340, 343, 346, 375/349, 350, 367, 368, 285; 370/320, 331, 370/332, 334, 335, 342, 350, 441, 503, 508, 370/509, 514, 515, 519, 520, 328; 455/436, 455/437, 439, 440, 446, 448, 449, 515, 434, 455/134, 135, 226.1, 226.2, 226.3, 296, 303
See application file for complete search history.

(56) References Cited

U.S. PATENT DOCUMENTS

| | | | | |
|---|---|---|---|---|
| 5,642,377 A * | 6/1997 | Chung et al. | ................ | 375/145 |
| 5,644,591 A | 7/1997 | Sutton | | |
| 5,805,648 A * | 9/1998 | Sutton | ................ | 375/367 |
| 5,812,593 A * | 9/1998 | Kaku | ................ | 375/150 |
| 6,044,074 A * | 3/2000 | Zehavi et al. | ................ | 370/350 |
| 6,044,104 A * | 3/2000 | Watanabe | ................ | 375/142 |
| 6,154,487 A * | 11/2000 | Murai et al. | ................ | 375/150 |
| 6,226,282 B1 * | 5/2001 | Chung | ................ | 370/335 |
| 6,320,849 B1 * | 11/2001 | Hughes et al. | ................ | 370/310 |
| 6,445,728 B1 * | 9/2002 | Byun | ................ | 375/142 |
| 6,466,606 B1 * | 10/2002 | Jou | ................ | 375/130 |
| 6,519,237 B1 * | 2/2003 | McDonough et al. | ................ | 370/335 |
| 6,542,743 B1 * | 4/2003 | Soliman | ................ | 455/436 |
| 6,546,248 B1 * | 4/2003 | Jou et al. | ................ | 455/434 |
| 6,549,545 B1 * | 4/2003 | Yamamoto et al. | ................ | 370/508 |
| 7,031,271 B1 * | 4/2006 | LaRosa et al. | ................ | 370/311 |
| 7,085,246 B1 * | 8/2006 | LaRosa et al. | ................ | 370/311 |

FOREIGN PATENT DOCUMENTS

GB 2320403 6/1998

OTHER PUBLICATIONS

International Search Report, dated Sep. 14, 2001.

\* cited by examiner

*Primary Examiner*—Khanh Tran
(74) *Attorney, Agent, or Firm*—Thomas R. Rouse; Charles D. Brown; Kenyon S. Jenckes

(57) ABSTRACT

In a remote unit of a wireless communication system, the speed of acquisition, or reacquisition, of a pilot signal by a search engine is increased. PN space is divided into segments and a coarse search of each segment is performed using a set of "fast" search parameters. A set of peak signal strengths along with their corresponding PN offsets, is saved for each segment of PN space. Following the search of all segments of PN space, the peak signal strengths which were saved during the coarse acquisition are evaluated. Coarse acquisition search results are used by the remote unit to determine fine search window parameters for subsequent searches performed by the remote unit search engine. The fine search parameters concentrate searching efforts on portions of PN space most likely to contain a viable base station pilot signal.

18 Claims, 8 Drawing Sheets

FAST ACQUISITION OF A PILOT SIGNAL IN A WIRELESS COMMUNICATION DEVICE

RELATED APPLICATIONS

The following U.S. Patent Applications filed concurrently herewith are related to this application and are hereby incorporated by reference in their entirety: REACQUISITION AND HANDOFF IN A SLOTTED MODE COMMUNICATION SYSTEM, U.S. patent application Ser. No. 09/540,801; EFFICIENT SEARCHING BY A REMOTE UNIT IN A SLOTTED MODE COMMUNICATION SYSTEM, U.S. patent application Ser. No. 09/540,800; PRIORITIZATION OF SEARCHING BY A REMOTE UNIT IN A SLOTTED MODE COMMUNICATION SYSTEM, U.S. patent application Ser. No. 09/540,802.

FIELD OF THE INVENTION

The invention relates to wireless communications systems. In particular, the invention relates to acquisition of a pilot signal in a wireless communication system.

BACKGROUND OF THE INVENTION

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 10A, a portable computer remote 10B, and a fixed location unit 10C such as might be found in a wireless local loop or meter reading system. Remote units may be any type of communication unit such as, for example, hand-held personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here as IS-95), the contents of which are incorporated by reference herein in their entirety. Additional information concerning a CDMA communication system is disclosed in U.S. Pat. No. 4,901,307, entitled SPREAD SPECTRUM MULTIPLE ACCESS COMMUNICATION SYSTEM USING SATELLITE OR TERRESTRIAL REPEATERS, (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a wireless communication system, a signal may travel several distinct propagation paths as it propagates between base stations and remote units. The multipath signal generated by the characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a channel can affect the signal received by the remote unit and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal is received at the output of the channel because the two signals, being equal amplitude and opposite phase, cancel each other. Thus, fading may have a severe negative effect on the performance of a wireless communication system.

A CDMA communication system is optimized for operation in a multipath environment. For example, the forward link and reverse link signals are modulated with a high frequency pseudonoise (PN) sequence. The PN modulation allows the many different multipath instances of the same signal to be separately received through the use of a "rake" receiver design. In a rake receiver, each element within a set of demodulation elements can be assigned to an individual multipath instance of a signal. The demodulated outputs of the demodulation elements are then combined to generate a combined signal. Thus, all of the multipath signal instances must fade together before the combined signal experiences a deep fade.

In a communication system based on the industry standard for CDMA, IS-95, each of the multiple base stations transmits a pilot signal having a common PN sequence. Each base station transmits a pilot signal offset in time from neighboring base stations so that the signals can be distinguished from one another at the remote unit. At any given time, the remote unit may receive a variety of pilot signals from multiple base stations. Using a copy of the PN sequence produced by a local PN generator, the entire PN space can be searched by the remote unit. Using the search results, the controller distinguishes pilot signals from multiple base stations based on the time offset.

In the remote unit, a controller is used to assign demodulation elements to the available multipath signal instances. A search engine is used to provide data to the controller concerning the multipath components of the received signal. The search engine measures the arrival time and amplitude of the multipath components of a pilot signal transmitted by the base stations. The effect of the multipath environment on the pilot signal and the data signal transmitted by a common base station is very similar because the signals travel through the same channel at the same time. Therefore, determining the multipath environment's effect on the pilot signal allows the controller to assign demodulation elements to the data channel multipath signal instances.

The search engine determines the multipath components of the pilot signals of base stations in the proximity of the remote unit by searching through a sequence of potential PN offsets and measuring the energy of the pilot signal received at each of the potential PN offsets. The controller evaluates the energy associated with a potential offset, and, if it exceeds a threshold, assigns a signal demodulation element to that offset. A method and apparatus of demodulation element assignment based on searcher energy levels is disclosed in U.S. Pat. No. 5,490,165 entitled DEMODULATION ELEMENT ASSIGNMENT IN A SYSTEM CAPABLE OF RECEIVING MULTIPLE SIGNALS (the '165 patent), assigned to the assignee of the present invention.

FIG. 2 shows an exemplifying set of multipath signal instances of a single pilot signal from a base station arriving at a remote unit. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the remote unit at a common time but has been transmitted by the base station at a different time. Each signal spike 22-27 has traveled a different path and therefore exhibits a different time delay, a different amplitude, and a different phase response. The six different signal spikes represented by spikes 22-27 are representative of a severe multipath environment. A typical urban environment produces fewer usable paths. The noise floor of the system is represented by the peaks and dips having lower energy levels. The task of the search engine is to identify the delay, as measured by the horizontal axis, and amplitude, as measured by the vertical axis, of signal spikes 22-27 for potential demodulation element assignment.

Note, as shown in FIG. 2, each of the multipath peaks varies in amplitude as a function time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time.

Typically, the operation of the search engine is overseen by a controller. The controller commands the search engine to step through a set of offsets, called a search window, that is likely to contain one or more multipath signal peaks suitable for assignment to a demodulation element. For each offset, the search engine reports the energy it found offset back to the controller. Demodulation elements may then be assigned by the controller to the paths identified by the search engine (i.e. the timing reference of their PN generators is aligned with the timing of the identified path). Once a demodulation element has locked onto the signal, it then tracks that path on its own without controller supervision, until the path fades away or until the demodulation element is assigned to another path by the controller.

As noted above, each base station in a given geographical area is assigned a sequence offset of a common PN pilot sequence. For example, according to IS-95, a PN sequence having $2^{15}$ chips and repeating every 26.66 milliseconds (ms) is transmitted by each base station in the system at one of 512 PN sequence offsets as a pilot signal. According to IS-95 operation, the base stations continually transmit the pilot signal which can be used by the remote unit to identify the base station as well as other functions, such as for example, determining the multipath environment the remote unit is operating in and synchronization of remote unit timing to the base station timing.

During initial power on, or any other situation when the remote unit has lost a pilot signal such as when performing a hard hand-off to a different operating frequency, the remote unit evaluates all possible PN offsets of the pilot PN sequence. Typically, a search engine measures the pilot signal strength at all possible PN offsets, proceeding at a measurement rate that produces an accurate measure of the pilot signal present at the corresponding offset. Proceeding in this manner, the search engine determines the PN offset of base stations which are geographically near the remote unit. Searching each PN offset in this manner can take anywhere from hundreds of milliseconds to a few seconds depending on the channel conditions during acquisition. This amount of time for the remote unit to reacquire a pilot signal is detrimental to the remote unit operation, and may be annoying to the user of the remote unit.

FIG. 3 shows an extended portion of PN space on the horizontal axis. The groups of peaks 30, 32 and 34 represent transmissions from three different base stations. As shown, the signal from each base station signal experiences a different multipath environment. Also, each base station has a different PN offset from the PN reference 36. Thus, the controller may select a set of PN offsets corresponding to search windows for any of the identified base stations. This allows the remote unit to simultaneously demodulate signals from multiple base stations by assigning demodulation elements appropriately.

One purpose of the search engine, as described above, is to aid in maintaining the wireless link between the remote unit and a base station. Because the wireless channel is constantly changing, multi-path searching must be performed on a virtually continuous basis, otherwise the wireless link may be lost due to, for example, fading. If the wireless link is lost, communications between the remote unit and the base station are terminated and the remote unit performs a search of the entire PN space to reacquire an appropriate base station. Searching the entire PN space consumes an excessive amount of time.

Therefore, there is a need in the art for a method of and apparatus to minimize the amount of time required for a remote unit, in a wireless communication system, to acquire or reacquire a pilot signal.

SUMMARY OF THE INVENTION

The invention increases the speed of acquisition, or reacquisition, of a pilot signal in a wireless communication system. The wireless communication system comprises a plurality of base stations, each configured to transmit a PN encoded pilot signal at a different time offset than the other base stations. In addition there is at least one remote unit that is configured to perform a search of the PN space.

In one embodiment, PN space is divided into segments. During a fast acquisition of a pilot signal, each of the segments of PN space is searched with "coarse," fast search engine parameters adjusted to increase the search rate. A set of peak signal strengths, along with their corresponding PN offsets, are saved for each segment of PN space. Following the search of segments of PN space, the peak signal strengths which were saved during the coarse acquisition are evaluated. The results of the coarse search are used to select "fine" search parameters for use in a second search of selected portions of the PN space. The fine search parameters concentrate searching efforts on portions of PN space most likely to contain a viable base station pilot signal, such as, for example, portions of the PN space with the highest measured signal strength during the coarse search.

Coarse search parameters may comprise a number of non-coherent passes that is less than the number of passes in the set of fine search parameters. In addition, the coarse search parameters may comprise an integration interval that is less than that in the set of fine search parameters.

Use of coarse search parameters by the remote unit can reduce the duration of the coarse search. In contrast use of fine search parameters produces more accurate and reliable results. However, fine search parameters result in a longer search period for a given portion of PN space that coarse search parameters. Therefore, using coarse search parameters to search the PN space, and then concentrating on selected portions of the PN space using fine search parameters, results in a shorter overall search duration while still achieving satisfactory search results.

BRIEF DESCRIPTION OF THE DRAWINGS

The features, objects and advantages of the present invention will become more apparent from the detailed description set forth below when taken in conjunction with the drawings in which like reference characters identify correspondingly throughout, and wherein.

DETAILED DESCRIPTION OF THE INVENTION

In many wireless communication systems such as, for example, IS-95 CDMA systems, a pilot signal is used to coordinate communication between a base station and a remote unit. The pilot signal is used, for example, to determine the multipath environment the remote unit is operating in, to synchronize timing between the base station and remote unit, and to monitor the signal strength from multiple base stations. According to IS-95, each base station transmits a pilot signal encoded with a common PN sequence and a unique offset. The common PN sequence is $2^{15}$ chips (32,768 chips) in length. The set of all possible PN offsets make up the PN space.

Figure 1:
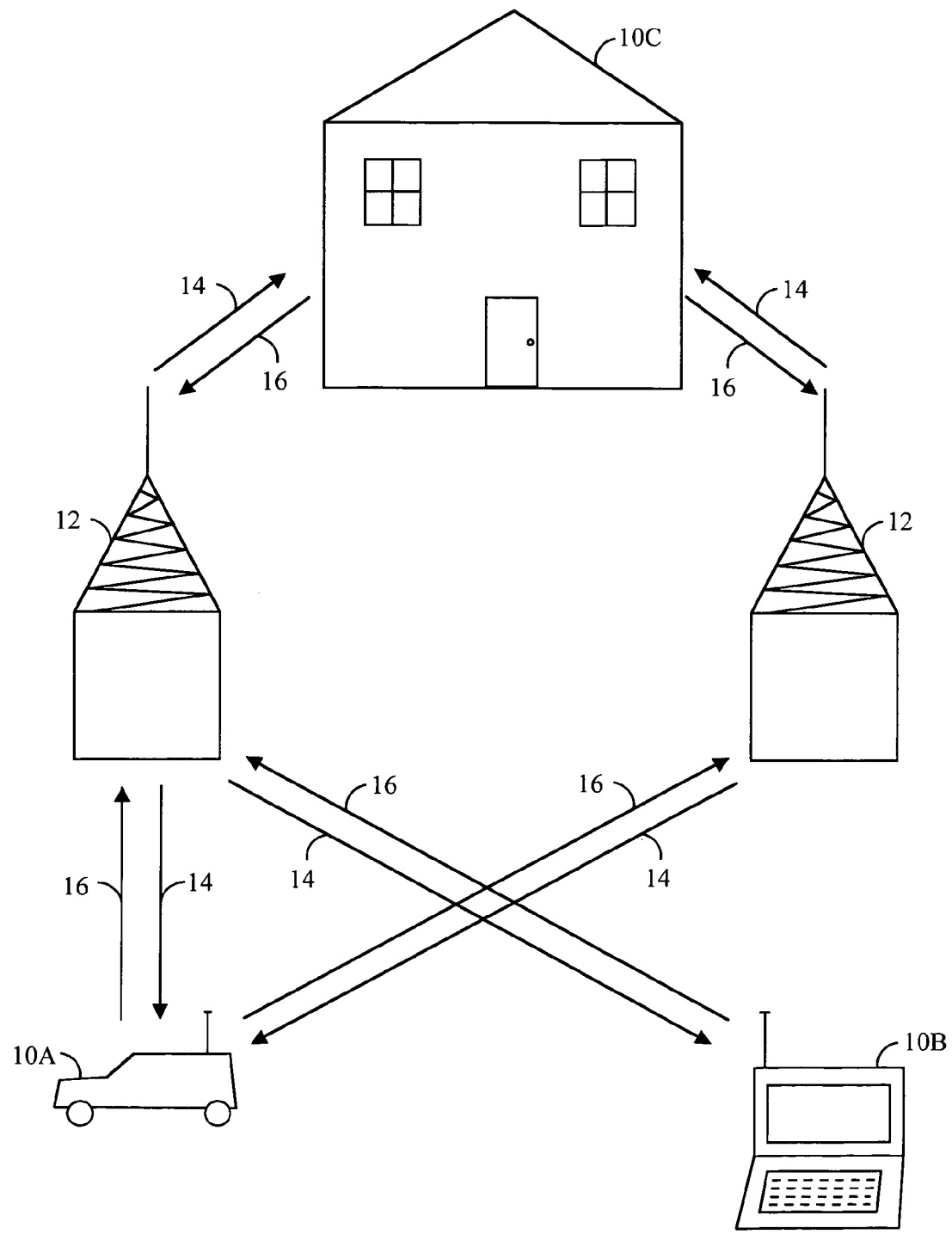
FIG. 1 is a representative diagram showing a typical modern wireless communication system.
Figure 2:
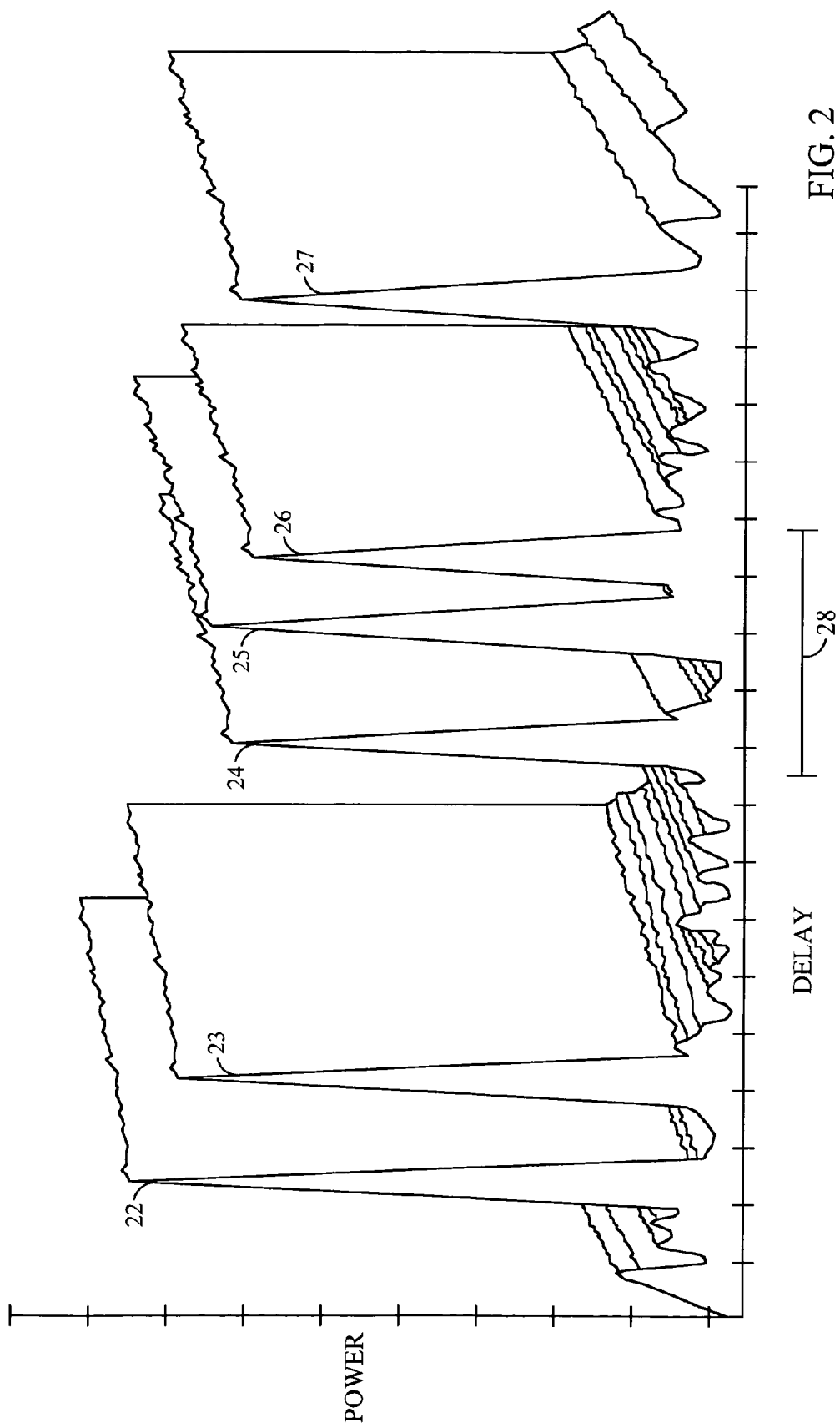
FIG. 2 is a graph showing an exemplifying set of multiple signal instances of a pilot signal from a single base station arriving at a remote unit.
Figure 3:
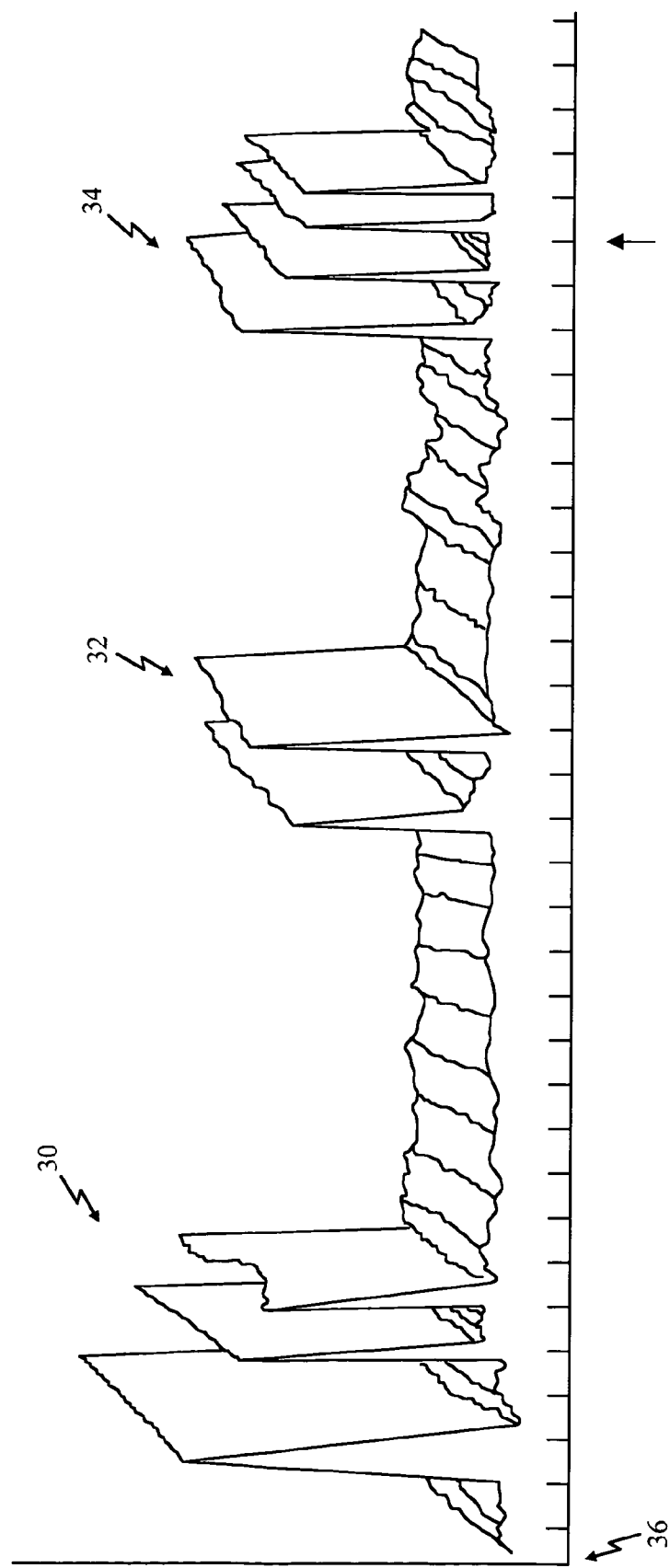
FIG. 3 is a graph showing an exemplifying set of multiple signal instances of pilot signals from multiple base stations arriving at a remote unit.
Figure 4:
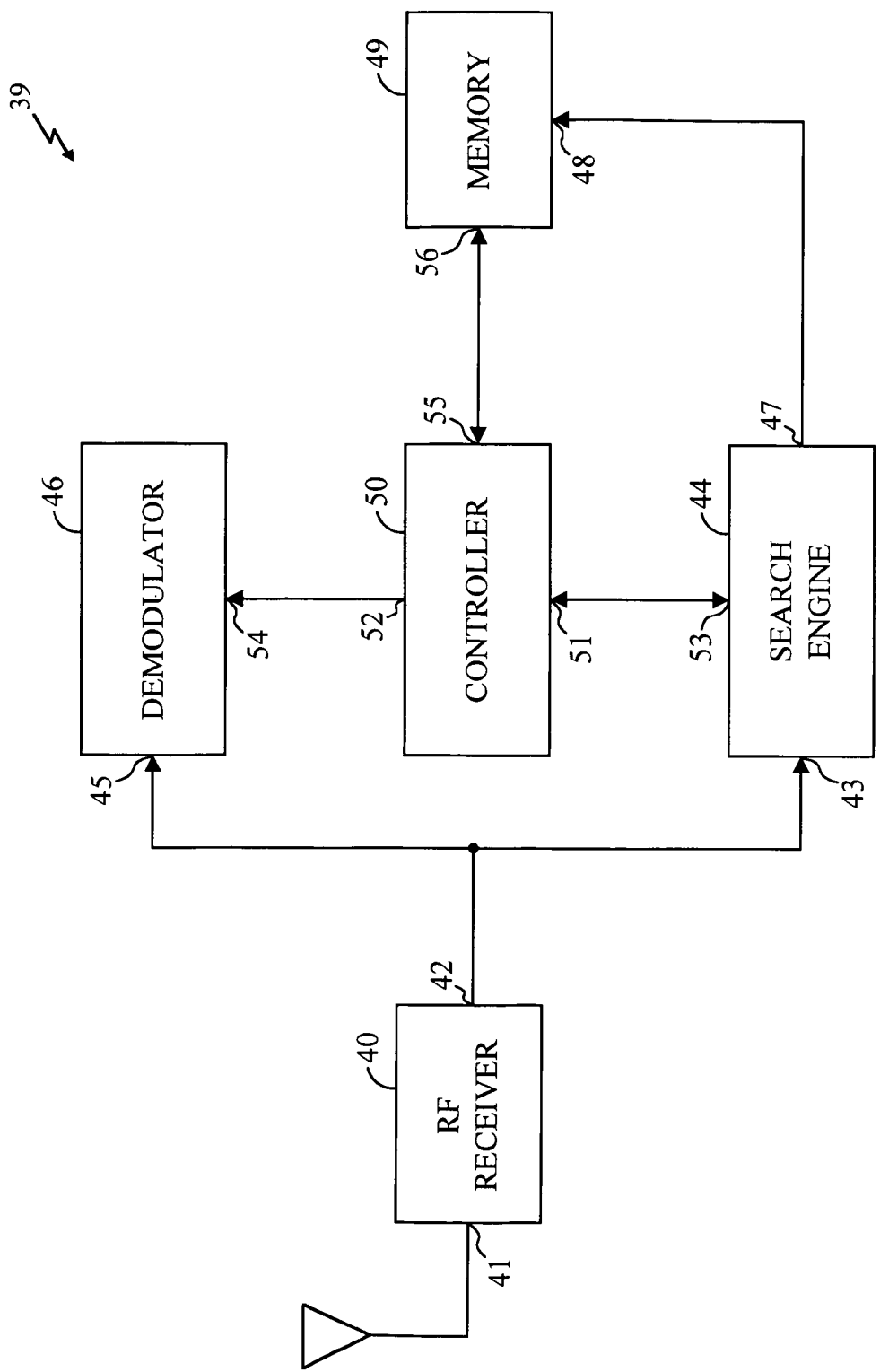
FIG. 4 is a block diagram of one embodiment of a remote unit.

FIG. 4 shows a block diagram of one embodiment of a remote unit 39 for use in the invention. In this embodiment an RF receiver 40 has an input port 41 configured to receive RF transmissions. The RF receiver 40 has an output port 42 coupled to an input port 43 of a search engine 44 and an input port 45 of a demodulator 46, respectively. The search engine 44 has an output port 47 coupled to an input port 48 of a memory 49 for storing search results. A controller 50 which has control outputs 51 and 52 coupled to control inputs 53 and 54 of the search engine 44 and the demodulator 46, respectively. In addition, controller 50 input port 55 is coupled to the memory 49 output port 56 so as to provide the controller 50 access to the search results stored in the memory 49 by the search engine 44.

In the embodiment of FIG. 4, the RF receiver 40 receives a transmission on the input port 41 from a base station (not shown). The output of the RF receiver 40 is passed via the output port 42 to the search engine 44 and the demodulator 46, respectively. The operations of the search engine 44 and demodulator 46 are controlled by the controller 50. In particular, controller 50 passes search parameters via output port 51 to input port 53 of the search engine 44. In addition, controller 50 passes control parameters via output port 52 to demodulator 46 input port 54 for assignment of demodulator elements within the demodulator 46 in the manner disclosed in the '165 patent. The controller 50 may be a microprocessor, application specific integrated circuit (ASIC), discrete logic, an analog controller or other control circuitry. The search engine 44 searches PN space, according to the search parameters, and places the search results in memory 49. The controller 50 evaluates the search results stored in memory 49 for assignment of elements of the demodulator 46 and for determination of future search parameters.

When the remote unit is initially powered on, the controller 50 creates a set of fast search parameters. The search parameters comprise a search window, an integration interval and a number of non-coherent passes, as described in U.S. patent application 09/346,369, entitled DYNAMIC ALLOCATION OF MICROPROCESSOR RESOURCES IN A WIRELESS COMMUNICATION DEVICE (the '369 application) filed Jul. 1, 1999, assigned to the assignee of the present invention and incorporated in its entirety herein by reference. The values of these parameters can affect the duration of a search.

In one embodiment of the invention, the controller 50 divides PN space into segments. A segment of PN space is a set of PN offsets. After dividing the entire PN space into segments each segment is searched using coarse search parameters. PN offsets, corresponding to portions of segments which have sufficient pilot signal strength, are stored for evaluation and possible further searching. Using coarse search parameters decreases the time required to perform a search, allowing the entire PN space to be searched quickly, identifying PN offsets of viable pilot signals. Following coarse searching, the PN offsets containing viable pilot signals are searched using fine search parameters. PN space may be divided into any desired number of segments, such as for example 8 segments. In addition, the segments may be of equal or unequal size.

In one embodiment of the invention, the controller 50 transfers the coarse search parameters to the search engine 44 for each segment sequentially. The search engine 44 then performs a search of a PN segment and analyzes the results. If the signal strength at a PN offset exceeds a threshold, the measured signal strength value and corresponding PN offset are stored in memory 49 for later evaluation by the controller 50. In one embodiment of the invention, the threshold is a set value, resulting in a variable number of PN offsets being stored by the search engine 44 for later evaluation. In another embodiment, the threshold is adjusted during the search process resulting in a fixed number of values being stored, such as for example the four strongest signal levels discovered in a PN segment. After the entire PN space has been searched, the controller 50 evaluates the search results stored in memory 49. Evaluation of the search results determines which portions of the PN space have the highest probability of containing a viable pilot signal such as, for example, those portions of the PN space with the highest measured signal level. The controller 50 then adjusts the search parameters such as, for example, selecting search windows corresponding to the portions of the PN space identified above.

Figure 5:
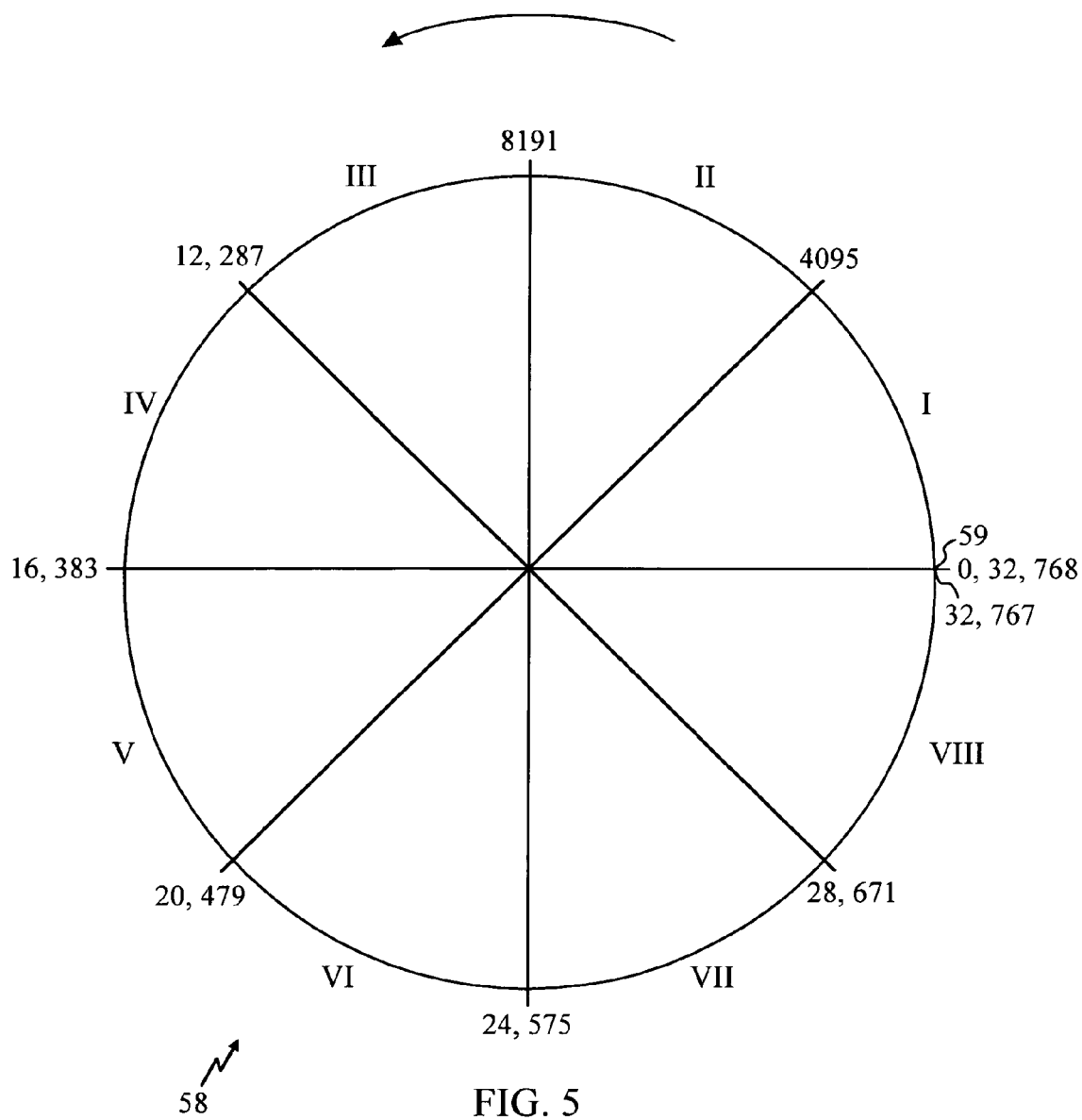
FIG. 5 is a chart representing PN space divided into segments.

FIG. 5 shows a representation of one embodiment of a strategy for dividing PN space into segments. As described above, each base station transmits the same PN sequence as a pilot signal. Each base station in a geographic region transmits the pilot signal at a unique offset. As noted above, according to IS-95, the pilot signal is a sequence having $2^{15}$ (32.768) PN chips and repeating every 26.66 milliseconds (ms). Thus, the pilot signal can be offset from the remote unit reference by any value from zero to 32,767 chips. Because the PN sequence is cyclic, repeating every 32,768 chips, it can be represented as a circle 58. The PN reference of the remote unit is located on the circle at the rightmost point 59 of the circle 58. Point 59 of circle 58 represents an offset of zero from the local PN reference in the remote unit. Rotation around the circle in a counterclockwise direction represents increasing PN offset from the local PN reference 59. In the embodiment of FIG. 5, PN space is divided into eight equal segments. In other embodiments, PN space may be divided into a different number of segments, and the segments may be of unequal size. In the embodiment shown in FIG. 5, the boundaries of the segments occur at PN offset values of 4095, 8191, 12,287, 16,383, 20,479, 24,575, 28,672 and 32,767 PN chips. When the PN offset has increased to a value of 32,768 chips, one complete PN period has been scanned, and continuing to search with increasing offsets above 32,767 PN chips results in a repeated search of the same PN space. Thus, a PN offset of 32,768 chips is equivalent to a PN offset to zero.

Continuing to increase PN offset continues rotation around the circle as described above. In one embodiment, as the search engine scans the segments of PN space, a set of maximum signal levels and the corresponding PN offsets are recorded. The number of values stored can be of any desired size, such as, for example, four values per segment.

Figure 6:
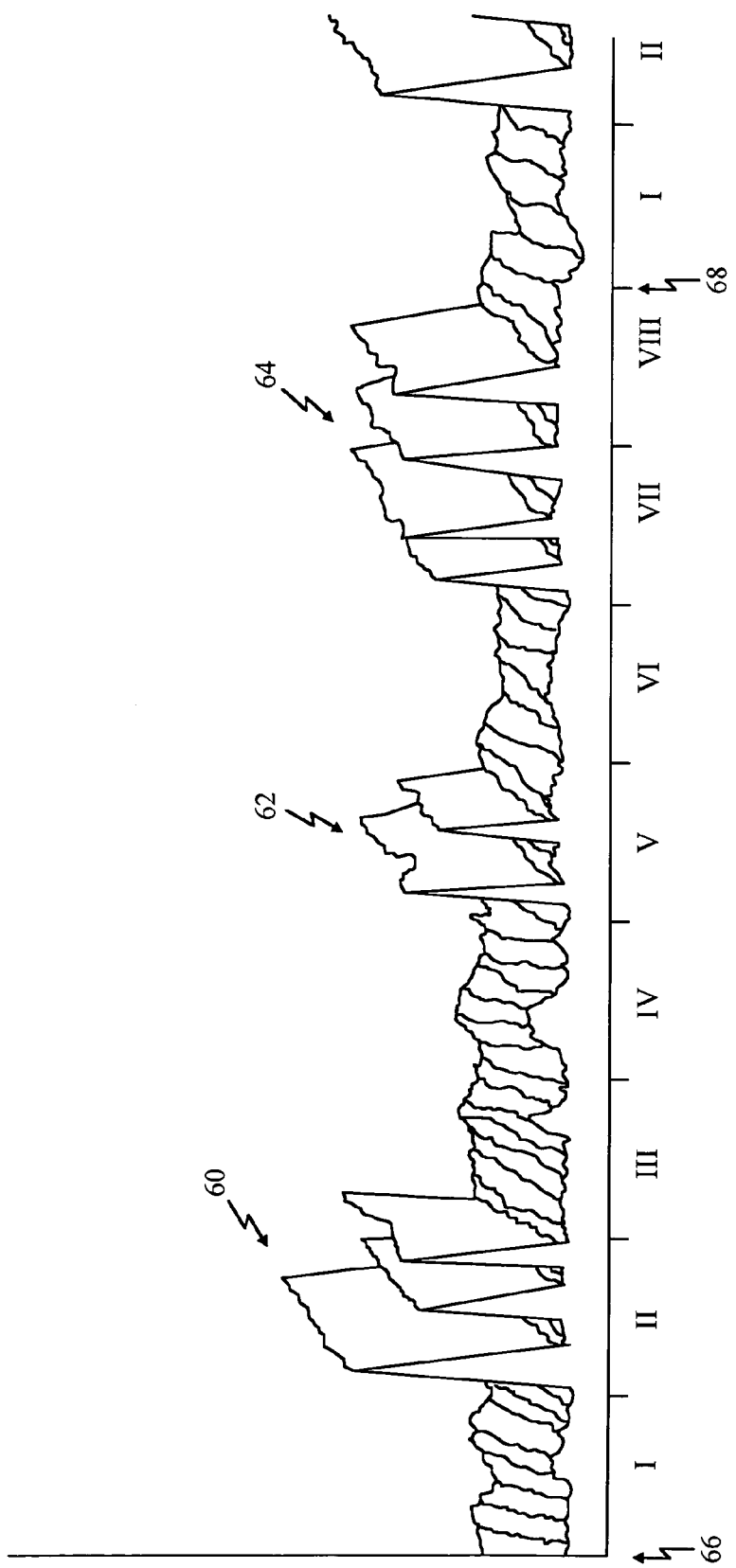
FIG. 6 is a graph showing an exemplifying set of multiple signal instances of pilot signals from multiple base stations relative to PN space segments arriving at a remote unit.

FIG. 6 shows an exemplifying set of multiple signal instances of pilot signals from multiple base stations, relative to PN space segments, arriving at a remote unit. The horizontal axis of FIG. 6 represents PN space. The vertical axis represents the power received at the remote unit in decibels (dB). The groups of peaks 60, 62 and 64 represent transmissions from three different base stations in proximity to the remote unit. As shown, the signal from each base station experiences a different multipath environment. Also, each base station has a different PN offset with respect to the remote units local PN reference 66. The horizontal axis of FIG. 6 is a linear representation of PN space. Similar to the circular representation of PN space, shown in FIG. 5, the horizontal axis is divided into eight equal segments. The boundaries of the segments correspond to PN offsets of 4095, 8191, 12,287, 16,383, 20,479, 24,575, 28,672, and 32,767 PN chips. As in the circular representation, once the PN offset has reached 32,767 chips, one entire PN period 68 has been scanned.

Figure 7:
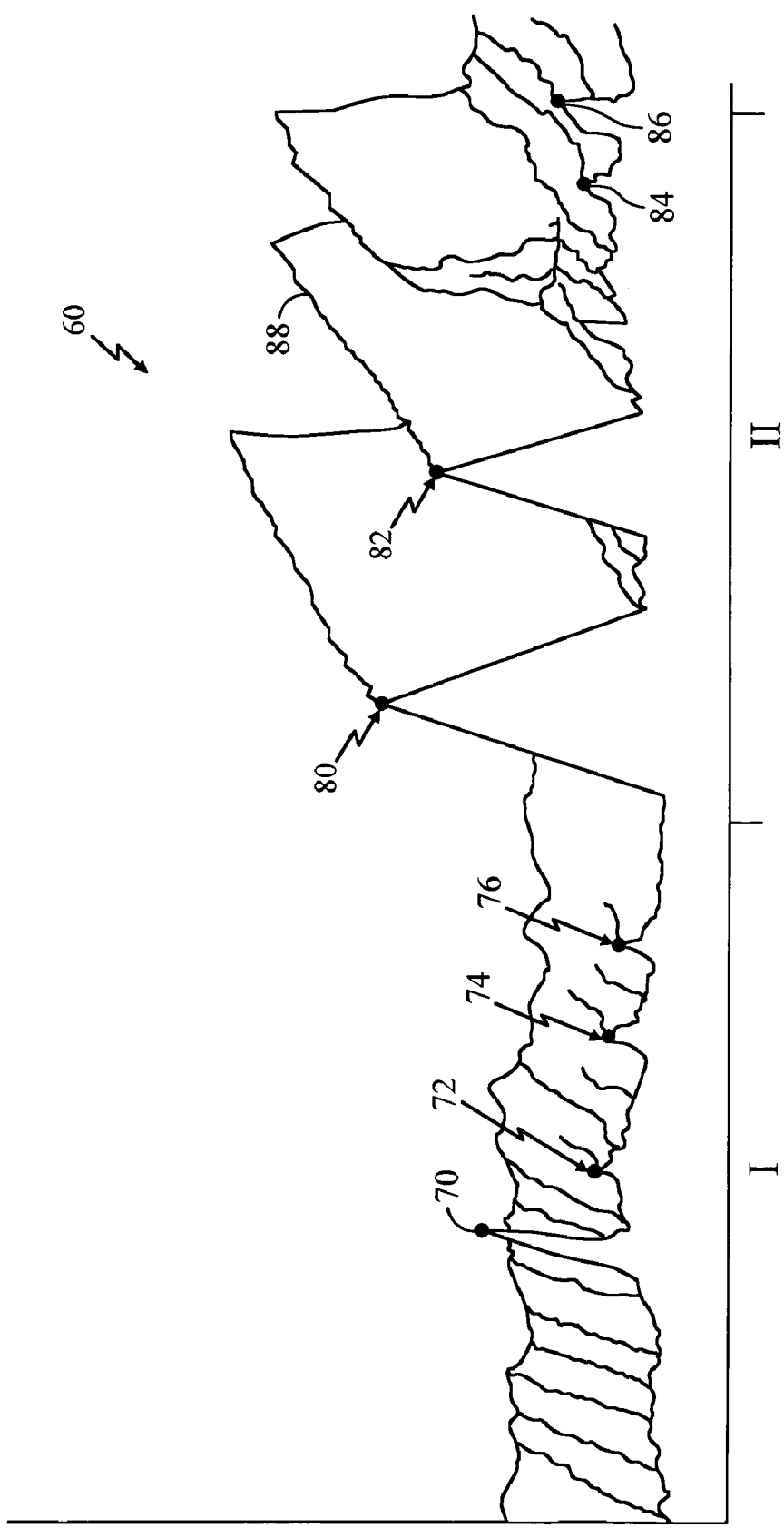
FIG. 7 is a graph showing an expanded view of an exemplifying set of pilot signals from a base stations relative to PN space segments arriving at a remote unit.

FIG. 7 is an expanded view of the first two segments of PN space represented in FIG. 6. The vertical axis represents the power received at the remote unit in decibels (dB). The horizontal axis represents PN space. Because FIG. 7 shows the first two segments of PN space represented in FIG. 6, the horizontal axis of FIG. 7 corresponds to PN offsets zero to 8191 and shows pilot signal 60 of one base station. In one embodiment of the invention, each segment of PN space is scanned by the search engine and the four strongest signal levels found in each segment, and the corresponding PN offsets, are recorded. In this embodiment, the search engine scans the first segment, PN offset zero to 4095, by stepping through various PN offsets.

During the search, the search engine 44 uses a set of coarse search parameters passed to the search engine 44 by the controller 50. The coarse search parameters are selected to achieve a desired search duration for a given segment of PN space. Search parameters may be selected in accordance with the invention described in the above-referenced '369 application. For example, the number of non-coherent passes may be set to 1, and the integration interval may be set to 0.1 msec. As the search engine 44 steps through the PN segment using the coarse search parameters, at each offset, the signal level of the pilot signal is measured. In one embodiment, where the threshold is adjusted, the four strongest signal levels of a PN segment are recorded. As shown in FIG. 7, in the first segment, the four strongest signal levels are represented by points 70, 72, 74 and 76. The search engine 44 records the signal level and PN offset for each point 70, 72, 74 and 76. This set of values is passed to memory for later evaluation by the controller 50.

The search engine 44 then scans the second segment, PN offset from 4096 to 8191, by increasing the PN offset, and stepping through the PN segment. At each offset, the signal level of the pilot signal is measured. In the second segment, the four strongest signal levels are represented by points 80, 82, 84 and 86. The search engine 44 records the pilot signal level and PN offset for each point 80, 82, 84 and 86. The search engine 44 repeats this process for the remaining segments until the entire PN space has been scanned.

Decreasing the search duration may result in a decrease in the accuracy of the measurement of the pilot signal by the search engine. Search parameters selected by the controller 50, for use by the search engine 44, are based on a tradeoff between search accuracy and search speed. Therefore, different coarse search parameters may be selected depending on, for example, the multipath environment the remote unit is operating in.

FIG. 7 illustrates a condition where an instance of a pilot multipath signal was not identified during the coarse search. As shown in FIG. 7, during the coarse search of the second segment of PN space, a multipath signal 88 of group 60 was missed. The signal level of the multipath signal 88 may have been low during measurement by the search engine due to, for example, a fade. Due to the signal level of multipath instance 88 being low, and the coarse search being completed before the fade terminates, the measured signal strength of peaks 84 and 86, which are not pilot signal instances, exceeded peak 88. Thus, the coarse search did not identify all the viable multipath instance of pilot signal group 60.

As discussed above, in a set of coarse search parameters, the number of non-coherent passes and the integration interval are typically decreased in order to decrease the amount of time required to complete a search. Because the search parameters are selected to decrease the search duration, the search engine 44 may occasionally miss a multipath signal peak due to, for example, a local fade, as exemplified in FIG. 7. Thus, for example, if the search engine 44 only takes one non-coherent pass of the PN space, and the integration period is set to 0.1 msec, an ill-times local fade as shown in FIG. 7 can result in obtaining an inaccurate measure of the average pilot signal level at that offset. In some situations, for example, if all the multipath instances of a pilot signal fade at the same time, a viable pilot signal may not be detected by the coarse search. However, in a typical situation, not all multipath instances will fade together. Therefore, some multipath instances of all viable pilot signals should be identified for subsequent searching using fine search parameters.

In one embodiment, following completion of searching all segments, memory 49 has stored a set of 32 peak signal levels, comprising four peaks in each of the eight segments, and the corresponding PN offsets. The controller 50 evaluates the set of 32 peak entries to determine the most likely location of pilot signals in the PN space. For example, the controller 50 may determine that the PN offset between peaks 80 and 82 is small enough, and the signal strength is strong enough, that these peaks are two instances of the same pilot signal that have undergone different delays due to the multipath environment. For example, in one embodiment the controller 50 may only evaluate peaks which exceed −15 dB signal strength. In another embodiment, the controller 50 may evaluate a set number of peaks, for example, the 32 strongest peaks found during searches.

In yet another embodiment, the controller 50 selects a fine search to include the entire region of possible reception offsets corresponding to a base station which would produce a peak at an offset found during the coarse search. For example, if a coarse peak is discovered which has an offset corresponding to a particular base station, a fine search is conducted over the entire range of PN offsets over which it is likely to detect that particular base station signal.

Evaluating the data from segments one and two in FIG. 7, it can be determined that all four points in segment one, 70, 72, 74, 76 and points 84 and 86 in segment two are relatively low signal levels compared to points 80 and 82 in segment two. Thus, the controller 50 may determine that there is a higher probability that a pilot signal is present in segment two, at the PN offset corresponding to points 80 and 82, than at other locations in segments one and two. Although one of the multipath signal peaks 88 of group 60 was missed during the fast search, two of the remaining peaks 80 and 82 were detected. Thus, unless all the multipath signals of a base station are at a low power level simultaneously, such as, for example, due to fading, the likelihood is that at least one of the multipath components of the pilot signal will be detected.

After determining the portions of PN space with a higher probability of containing a viable pilot signal, the controller 50 selects search windows where fine searching will be performed. In one embodiment, the controller 50 may select a search window, for performing a fine search, centered about the PN offset of peak 80 wide enough to encompass peak 82. In another embodiment, the controller 50 may select a search window that begins 3 chips before the PN offset for peak 80 and includes increasing PN offsets of 6 chips.

Evaluation by the controller 50 is performed on the data from all eight segments. Following evaluation of the search results, the controller 50 is able to select search windows as described above. In addition, because the pilot signal power level has been measured, other search parameters, such as for example integration interval and number of noncoherent passes, may be sent to the search engine, in accordance with the invention described in the above-referenced '369 application.

In accordance with the '369 application, the controller 50 selects search parameters for the search engine to use in a "fine" search. In one embodiment the fine search may be focused on the portions of PN space identified during evaluation of the coarse search results, as having a high probability of containing a pilot signal. In another embodiment the portions of PN space which are searched using the fine search parameters are identified by a preferred base station and communicated to the remote unit.

As described above, the controller 50 may select a search window based upon the region of the PN space identified during the coarse search as having the highest probability of containing a pilot signal. The controller 50 may also select a number of non-coherent passes and an integration interval based in part on the power level of the pilot signal measured during the coarse search, and the number of portions of PN space that are to be searched. For example, the controller 50 may select an integration interval in the range of 0.1 msec and 2 non-coherent passes if the pilot signal power level was measured at −13 dB during the coarse search. In another example, if the pilot signal power level was measured at −15 dB during the coarse search, the controller 50 may select an integration interval of 0.06 msec and 8 non-coherent passes. Further details on selecting search parameters may be found in the above-identified '369 application.

Figure 8:
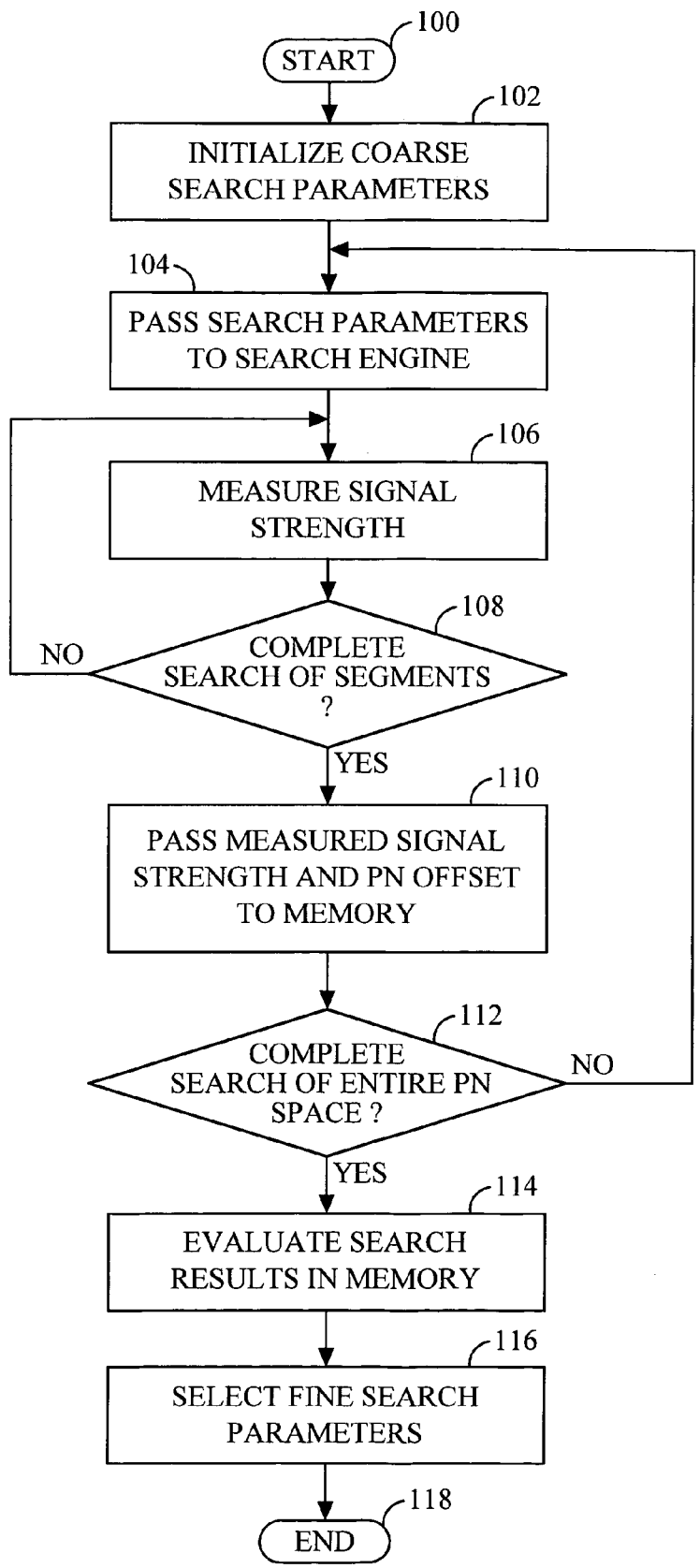
FIG. 8 is a flowchart showing operation of the fast acquisition of a pilot signal.

FIG. 8 is a flowchart of an embodiment of the invention illustrating the process of performing a coarse search. Flow begins in block 100. In block 102, the search parameters for the coarse search are initialized. As discussed in the '369 application, various parameters, such as for example integration interval and number of non-coherent passes make up a set of search parameters. Flow then continues to block 104 where the coarse search parameters are sent from the controller 50 to the search engine 44. In block 106, the search engine 44, using the coarse search parameters, performs a search of the PN space specified by the search parameters. Flow continues to block 108 where it is determined if the entire segment has been searched. If the entire segment has not been searched, flow continues to block 106 where the search engine 44 continues to search. If in block 108 it is determined that an entire segment has been searched, flow continues to block 110. In block 110 the search engine 44 passes the number of measured signal strengths and the corresponding PN offsets of the peak values, as specified by the controller 50, to memory 49 for later evaluation by the controller 50. Flow then continues to block 112.

In block 112 it is determined if the entire PN space has been searched. If the entire PN space has not been searched, flow continues to block 104 and search parameters for the next PN segment are downloaded to the search engine 44. If in block 112 it is determined that the entire PN space has been searched, flow continues to block 114. In block 114 the controller 50 evaluates the search results transferred from the search engine 44 to memory 49 during search of the PN space. Following evaluation, flow continues to block 116 where the results from the evaluation of the coarse scan results are used by the controller 50, and in accordance with the above-referenced '369 application, the controller 50 then selects appropriate parameters for use by the search engine 44 during fine search operations.

More information concerning the searching process, demodulating element assignment and search engines can be found in:

(1) U.S. Pat. No. 5,644,591, entitled METHOD AND APPARATUS FOR PERFORMING SEARCH ACQUISITION IN A CDMA COMMUNICATIONS SYSTEM;

(2) U.S. Pat. No. 5,805,648, entitled METHOD AND APPARATUS FOR PERFORMING SEARCH ACQUISITION IN A CDMA COMMUNICATIONS SYSTEM;

(3) U.S. Pat. Nos. 5,867,527 and 5,710,768, entitled METHOD OF SEARCHING FOR A BURSTY SIGNAL;

(4) U.S. Pat. No. 5,764,687, entitled MOBILE DEMODULATOR ARCHITECTURE FOR A SPREAD SPECTRUM MULTIPLE ACCESS COMMUNICATION SYSTEM;

(5) U.S. Pat. No. 5,577,022, entitled PILOT SIGNAL SEARCHING TECHNIQUE FOR A CELLULAR COMMUNICATIONS SYSTEM;

(6) U.S. Pat. No. 5,577,022, entitled CELL SITE DEMODULATION ARCHITECTURE FOR A SPREAD SPECTRUM MULTIPLE ACCESS COMMUNICATION SYSTEMS;

(7) application No. 08/987,172, entitled MULTI CHANNEL DEMODULATOR, filed on Dec. 9, 1997; and (8) application No. 09/283,010, entitled PROGRAMMABLE MATCHED FILTER SEARCHER, filed on Mar. 31, 1999;

each of which is assigned to the assignee hereof and incorporated herein by reference, in its entirety.

Thus, the invention overcomes the longstanding problems in the art of quickly acquiring an appropriate base station if the wireless link is lost by performing a coarse, fast, search of the entire PN space and then concentrating searches on selected portions of PN space having a higher probability of containing a viable pilot signal.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A wireless communication system comprising:
a plurality of base stations, each configured to transmit a PN encoded pilot signal at a different time offset than other base stations; and
at least one remote unit configured to perform a coarse search of an entire PN space in accordance with a set of coarse search parameters, to use results of the coarse search of the entire PN space to select portions of the PN space for a fine search, and to perform the fine search of the selected portions of the PN space in accordance with a set of fine search parameters.

2. The wireless communication system of claim 1 wherein during the coarse search, the number of non-coherent passes is reduced in comparison with the fine search.

3. The wireless communication system of claim 1 wherein during the coarse search, an integration interval is reduced in comparison with the fine search.

4. A remote unit in a wireless communication system comprising:
a search engine configured to receive a set of coarse search parameters, to conduct a coarse search of an entire PN space in accordance with the set of coarse search parameters to detect for signals in the wireless communication system, to output search results for the entire PN space, to receive a set of fine search parameters and a selection of portions of the PN space, to conduct a fine search of the portions of the PN space in accordance with the set of fine search parameters, and to output search results for the portions of the PN space;
a memory configured to receive and store the search results from the search engine and to output the search results; and
a controller configured to pass the set of coarse search parameters to the search engine, to receive the search results for the entire PN space from the memory, to select the portions of the PN space as likely to contain a pilot signal based on the search results for the entire PN space, and to pass the set of fine search parameters and the selection of the portions of the PN space to the search engine.

5. The remote unit of claim 4, wherein the set of coarse search parameters comprises a number of non-coherent passes selected from a range of non-coherent passes, and wherein the number of non-coherent passes in the set of coarse search parameters is less than in the set of fine search parameters.

6. The remote unit of claim 4, wherein the set of coarse search parameters comprises an integration interval selected from a plurality of predetermined integration intervals, and wherein the integration interval in the set of coarse search parameters is less than in the set of fine search parameters.

7. The remote unit of claim 4, wherein the entire PN space is divided into equal segments, and wherein for the coarse search the search engine is configured to search one segment at a time until all segments are searched.

8. The remote unit of claim 4, wherein the entire PN space is divided into unequal segments, and wherein for the coarse search the search engine is configured to search one segment at a time until all segments are searched.

9. The remote unit of claim 4, wherein the portions of the PN space are for peaks exceeding a predetermined signal strength identified by the search results for the entire PN space.

10. The remote unit of claim 4, wherein the portions of the PN space are for a predetermined number of strongest peaks identified by the search results for the entire PN space.

11. The remote unit of claim 4, wherein the portions of the PN space are for a region of possible PN offsets for a base station.

12. The remote unit of claim 4, wherein the portions of the PN space are identified by a preferred base station.

13. A method of initially acquiring a base station by a system remote unit, the method comprising:
- selecting a set of coarse search parameters comprising a number of noncoherent passes and an integration interval;
- conducting a coarse search of an entire PN space for a pilot signal according to the set of coarse search parameters;
- storing results of the coarse search in a memory;
- selecting portions of the entire PN space based on the results of the coarse search of the entire PN space; and
- conducting a fine search of the selected portions of the entire PN space according to a set of fine search parameters.

14. The method of claim 13 wherein the number of non-coherent passes in the coarse search is less than in the fine search.

15. The method of claim 13 wherein the integration interval in the coarse search is less than in the fine search.

16. The method of claim 13 further comprising:
- storing all measured signal levels identified during the coarse search which exceed a threshold level and corresponding PN offsets.

17. A remote unit in a wireless communication system configured to perform a search for a pilot signal, the remote unit comprising:
- means for selecting a set of coarse search parameters comprising a number of noncoherent passes and an integration interval;
- means for conducting a coarse search of an entire PN space for a pilot signal according to the set of coarse search parameters;
- means for storing results of the coarse search;
- means for selecting portions of the entire PN space based on the results of the coarse search of the entire PN space; and
- means for conducting a fine search of the selected portions of the entire PN space according to a set of fine search parameters.

18. A method of searching in a wireless communication system the method comprising:
- transmitting a PN encoded pilot signal from a plurality of base stations, each base station configured to transmit said PN encoded pilot signal at a different time offset than other base stations;
- performing a coarse search of an entire PN space in accordance with a set of coarse search parameters by at least one remote unit;
- selecting portions of the entire PN space based on results of the coarse search of the entire PN space; and
- performing a fine search of the selected portions of the entire PN space in accordance with a set of fine search parameters.

* * * * *